INVENTOR
George A. Rubissow

INVENTOR
George A. Rubissow

3,311,295
GYROFUGATION METHOD AND MEANS THEREFOR
George A. Rubissow, 420 Riverside Drive, New York, N.Y. 10025
Filed Feb. 16, 1961, Ser. No. 101,597
20 Claims. (Cl. 233—1)

This invention refers to a gyrofugation method, means, for performing the same and products so obtained, for separation (segregation) of fluids, gaseous substances, vapour-like substances, liquids, pasty substances powdered materials intermixed with fluids, and metals in molten states, or mixtures of any of the beforementioned states of materials, hereinafter designated as materials to be treated. This method permits the separation (segregation) of said materials to be treated into a first material composed substantially or sometimes nearly exclusively of heavier specific weight particles (or molecules or atoms) which were intermixed or formed a part of such materials to be treated into at least one second material composed substantially or nearly exclusively of lighter specific weight particles (or molecules or atoms) which were intermixed or formed a part of such materials to be treated.

It is known to separate materials to be treated into heavier and lighter components by subjecting such materials to be treated to an action of centrifugal force produced by rotating a container with such materials to be treated around an axis of rotation. Such processes, however, are not efficient.

The method of the present invention is particularly applicable for separation (segregation) of heavy isotopes from a mixture of heavy and lighter isotopes, for instance, by way of example, the separation of a mixture of uarnium as it mostly occurs in nature. Generally, natural uranium contains 140 times more $U^{238}$ than $U^{235}$. It is known that the energy produced from one lb. of $U^{235}$ by fission would yield 400 billion ergs, or about 12,000,000 kilowatt-hours. Therefore, the present invention is extremely important for producing by gyrofugation the segregation of $U^{235}$ and $U^{238}$ from natural uranium. Any suitable gaseous or liquid form of material containing uranium could be used, for instance. The gas uranium-hexafluoride could be so gyrofuged. Any other gaseous forms of uranium-containing material could be used as well.

In the same manner, the method of the present invention could treat and segregate, by gyrofugation, hydrogen isotopes either $_1H^2$ designated as deuteron (D) and $_1H^3$ designated as triton (T) and also any combination of them with H. For instance, D+H, T+H, D+D, D+T, T+T, 5H, and so on.

The method of the present invention is also most economically and efficiently applicable for separating a mixture of water $H_2O$ with heavy water $D_2O$ into heavy water $D_2O$ and ordinary water $H_2O$. It is known that in 5000 to 6000 kilograms of ordinary water $H_2O$ about one-half to one kilogram of heavy water $D_2O$ is present.

The present invention consists in a gyrofuge for segregation of a material to be treated by subjecting it to gyrofugation, said material being composed of at least two specific weight components, a heavier weight component and a lighter specific weight component, said gyrofuge comprising a frame, a first shaft-like member which is rotated around a first axis of rotation XX being rotatably mounted on said frame, a second shaft-like member being rigidly mounted in respect to said first shaft-like member, means to rotate said first shaft-like member in respect to said frame, a closed container for said material being rotatably mounted on said second shaft-like member and rotating around a second axis YY of rotation concentric with said second shaft-like member the said container thus being simultaneously rotated around said second axis YY and around said first axis XX, thus exercising a gyrofugation force upon said material, conduit means provided in said first shaft-like member and communicating with a first channeling means provided in said second shaft-like member to channel said material into the inner closed space of said container where it is subjected to the action of gyrofugation forces, at least one first channeling discharge means for said heavier component being provided in the area of maximum values of said gyrofugation forces, to conduct it through a first conduit and a first valve to a recipient of said heavier component and at least one second channeling discharge means for said lighter component being provided in the area of minimum values of said gyrofugation forces to conduct it through a second conduit and a second valve to a recipient of said lighter component.

The invention also consists in a method of segregation of a fluid material having at least two components, one heavier and one lighter specific weight component, comprising the steps of subjecting said material to a continuous gyrofugation action composed of a simultaneous action of two differently directed contrifugal forces, which due to the changing in their respective values and directions produce a segregating of said material into at least two of its said components and continually place said components in at least two different areas of segregation and thereafter expel continually each of said so segregated components from said areas while controlling and balancing during such evacuation of them the exact desirable discharge quantum and speed of respective outputs of each so dischargeable segregated components into storage recipients.

The axis of rotation XX may be placed concentrically with the container or eccentrically to the container, and the axis of rotation YY may be concentric or eccentric to the symmetrical axis of the container and could be either intersecting the first axis of rotation XX at an angle from 0° to 180° in regard to the YY axis (for instance, by way of example, the angle between YY and XX can be 90° or 60° or 30°, etc.) or not intersecting the axis XX, that is to say the axes do not have any common plane in which they lie. Such double centrifugation when applied simultaneously is herein designated as gyrofugation.

Such gyrofugation is highly effective for separating the material to be treated into two or more components according to the specific weight of their components.

It will be appreciated that in operation of the gyrofuge of the invention, it is possible to feed the MT into the container during its rotation about one or both axes XX and YY or around only one axis, the gyrofugation making it possible to draw out through one or more conduits the heavier particles or a mixture of heavier particles with a small amount of lighter particles or a mixture of such light particles with a little amount of heavier particles. Additional conduits may be provided for other combinations of particles, according to their specific weights.

While the ordinary centrifuges have to rotate up to 40,000 r.p.m. and higher, which requires very costly machinery, the gyrofugation machines, according to this invention, could perform a better and more clean segregation of components while rotating the material to be treated at lower r.p.m.

In order to make the invention more clearly understood, reference will now be made to the accompanying drawings, which are given by way of example and in which:

FIGURE 2 is a plan view of part broken out from FIGURE 1.

FIGURES 3, 4, 5, 6 are schematical cross-sectional views of FIGURE 1 following respective section lines IV—IV, V—V and VI—VI, with parts broken off, FIGURE 6 is viewed from left to right.

Like references will be used whenever possible for like meanings on all the drawings for identical components.

Figure 1:
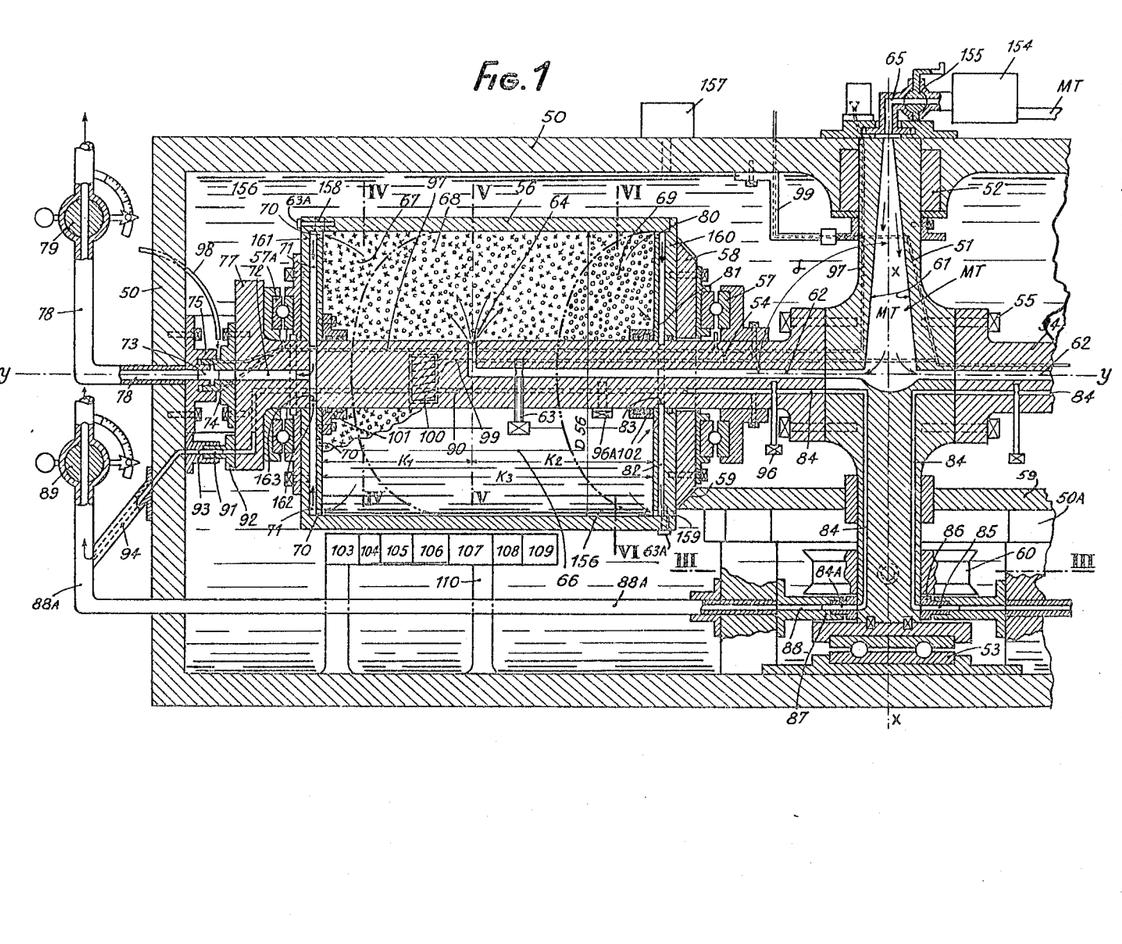
FIGURE 1 is a schematical simplified cross-sectional side view of one form of a gyrofuge of the invention.

One of the embodiments of this invention is illustrated on FIGURE 1. A frame 50 (which may be a strong shock-proof frame or if desired a housing hermetically sealing the gyrofuge—to protect it against accident) has a first shaft-like member 51 rotatably mounted in bearing means 52 and 53 on said frame 50 and thus is rotatable around the vertical axis XX, called the first axis of rotation in regard to the container. A second shaft-like member 54 is rigidly mounted with respect to the first shaft-like member 51 by suitable means such as bolts 55, screws, rivets, or by bayonet or other attachment means well known in the art. This second shaft-like member 54 has a container 56 mounted rotatably upon it. This container 56 is the container which receives the material to be treated and which subjects it to the gyrofugation. Bearing means 57 and 57A are provided between the second shaft-like member 54 and the container 56 to permit the container to be rotated around the shaft-like member 54, i.e. around the second axis of rotation YY. When axes XX and YY are in the same plane as shown in FIGURES 1, 7, 8, 9, 11, 24, and 25, the angle between XX and YY may be from 0° to 180°. On FIGURE 1 the angle is 90°, on FIGURES 7 and 11 the angle is 45°— this by way of example only.

The container 56 is rotated around the first axis XX while at the same time it is rotated around the second axis YY. Such gyrofugation could be produced by any suitable means, for instance by an electric motor mounted upon the second shaft-like member 54 and by one other motor rotating the first shaft-like member 51. Such motors are not shown in the figures.

In FIGURES 1, 7, 8, 11, 24, and 25 are shown means to produce the gyrofugation of the container 56. A second bevel gear 58 mounted rigidly in respect to the container 56 but freely rotatable around the second shaft-like member 54 (thus this second bevel gear having in its center part an opening through which the shaft-like member 54 could pass freely) is shown on FIGURE 1. This second bevel gear 58 operatively engages with a first bevel gear 59. The first bevel gear 59 is non-rotatably mounted on means 50A in respect to the frame 50 in FIGURE 1. Similar means are used to hold the gear 59 from rotation relative to the frame in the other figures. Thus, when the first shaft-like member 51 is rotated by any suitable means, for instance by a motor operatively connected through a gear chain, friction connection, or through a belt and pulley 60, then this first shaft-like member 51 is rotated around the axis XX and at the same time the bevel gear 58 (while the whole body is rotating accordingly around XX) will also be automatically rotated, due to bevel engagement with the bevel gear 59, around the axis YY, and thus it obligatorily rotates the container 56 around the axis YY and simultaneously around the axis XX. If desired, some clutch means, hydraulic, electric, magnetic, or friction type known in the art, could be interposed between the first gear 59 and the frame 50. On FIGURE 11, the first gear 59 is held by means not shown, so as to be non-rotatable and is simply pushed up and down as shown in dotted lines to engage or disengage one from another the first gear 59 and the second gear 58.

The first shaft-like member 51 is provided with a required number of channels or tubular conduits. One of them, for instance, the central conduit 61, FIGURE 1, may be used for feeding the material to be treated, into the container 56 through the conduit 62. This conduit 62 could be provided with a valve 63 to control the cross-section of the conduit 62 as desired or to close it totally. The outlet of the conduit 62 may have only one outlet 64; or it may have more of such outlets 64 for the same conduit 62, FIGS. 1 and 23. The conduit 61 is shown as concentric with the first shaft-like member 51, and the conduit 62 as concentric with the second shaft-like member 54. If desired, they may be placed eccentrically to them. It is obvious that only one conduit could be placed concentrically, thus other conduits for other uses have to be placed eccentrically to the respective axis of rotation.

The container 56 could have a removable top cover 160 and a removable or fixed bottom cover 161 and according to this invention, these covers are provided with a plurality of channels and exists which perform the evacuation of the segregated components of the material to be treated once they are ready for the evacuation.

Figures 2, 3, 4, 5:
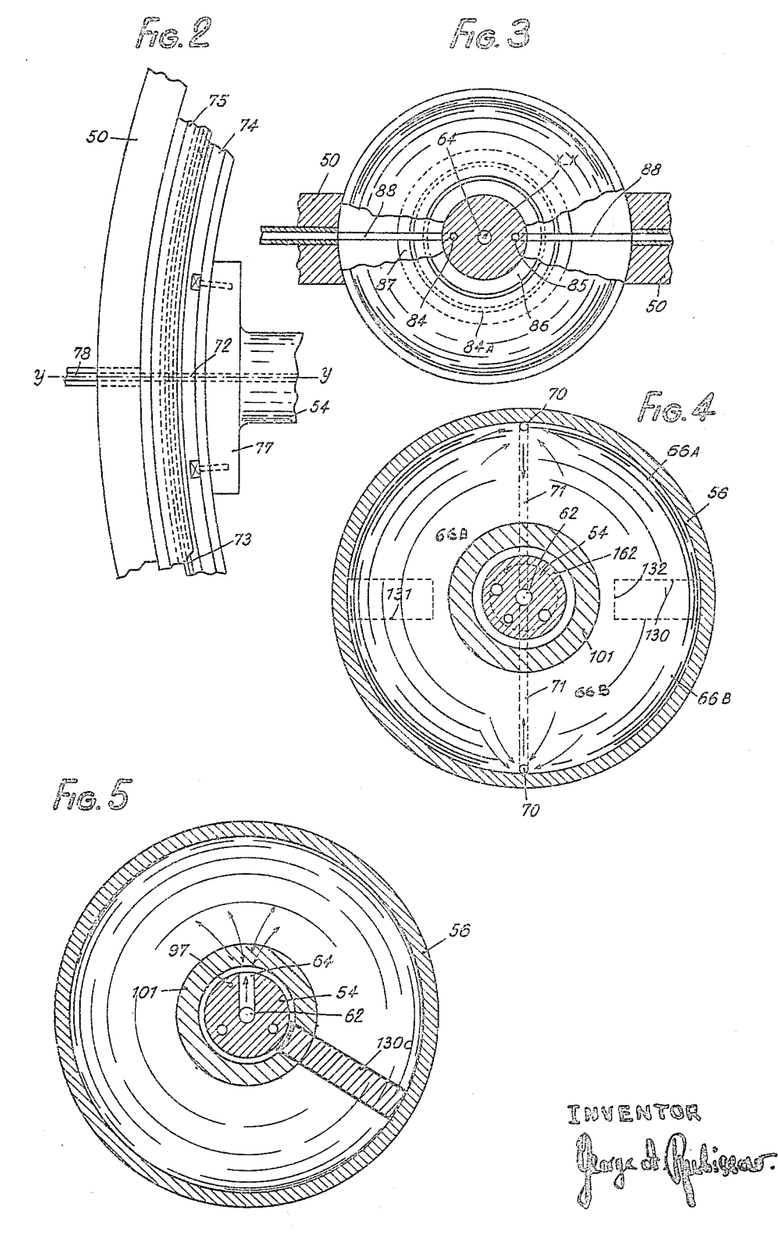

When the material to be treated is fed by a pump 154 (or by gravity) through feeding pipe 65 into the conduit 61, the gyrofugation action acts extremely strongly upon the so introduced into the container material to be treated and subjects it to a simultaneous double rotation around the two respective axes XX and YY, thus producing the phenomena of gyrofugation. The result of it is that even the smallest particles (molecules or atoms) are subjected to two pulsating and vector changing centrifugal forces and also are subjected to at least one Coriolis effect, and thus the heavier particles or molecules or atoms will be thrown out to that area of the container where the gyrofugation produces a bigger gyrofugation force, i.e., in FIGURE 1 and FIGURE 22 most of the heaviest components (or particles) will be thrown out towards the area 67 (approximately), while the medium heavy particles and light particles and the fresh entering material to be treated will be situated somewhere about the region as indicated by 68 (approximately), and while most of the lighter weight components (particles, molecules, atoms) will try to place themselves about the area designated as 69 (approximately). These designations of areas are approximate and only schematical and the true areas can be well defined in practice and by calculations for each particular material to be treated and each form of container and for the respective r.p.m. (around the axes XX and YY) at given temperatures of the material to be treated. Now, when such a container is thus filled with the material to be treated and is subjected to gyrofugation, then after some time of gyrofugation the heavier particles will be gathered in the area 67 while the lighter ones in the area 69. Special openings are provided in these areas according to this invention to permit respectively the evacuation through them of the so segregated particles. For this purpose, an opening or several openings 70 could be provided in the bottom plate 161 or about as shown in FIGURES 1 and 4. These openings could be as small or as large as required. Means could be provided to control the gauge of these openings. These openings are interconnected with the outlet channels 71 which are interconnected with other outlet channel 72, preferably concentric with the second shaft-like member 54, through the intermediary of a circular collar groove 162 which is operatively interconnected through a channel 163 which passes through the shaft-like member 54 and is interconnected with channel 72. The exit of the channel 72 is thus rotating around the axis XX.

In FIGURES 1 and 2 this exit 72A is emerging into a circular channel 73 provided in between the circular members 74 and 75, circular member 74 being affixed rigidly in respect to the first and second shaft-like members and rotating therewith around axis XX. Circular member 75 is rigidly affixed in respect to the frame 50 and thus stationary. Suitable lubricating means may be provided to lubricate the contact surfaces between circular members 74 and 75. For this reason it is recommended to make the diameter D56 of the container 56 bigger to reduce the length of the second shaft-like member 54. The circular collecting channel or groove 73 could be of any form and cross-section and the embodiments shown in FIGURES 1 and 2 are only examples. The channel 73 interconnected with the exit channel 78 passes through the frame 50 and has a control valve 79.

Figure 6:
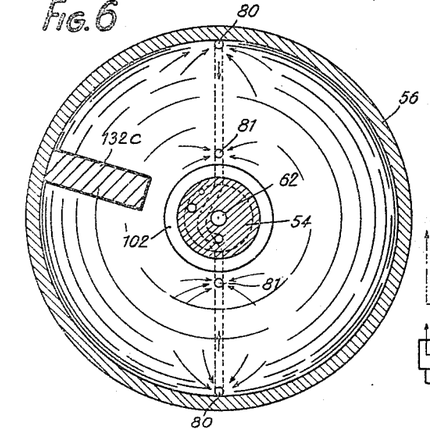

After passing through the valve 79 the segregated material is then stored wherever desired. The lighter specific weight components so segregated could be expelled through the openings 80 and/or 81 provided in an area 69 as shown in FIGURES 1 and 6. The openings could be placed wherever most efficient, for instance 80 and 81, or only 81 type of openings may be used. The openings 80 and/or 81 (one or more) are interconnected with the channel or channels 82 emerging into the circular collecting groove or channel 83 mounted in the top cover 160 of the container 56 and operatively interconnected with the exit channel 84 which is provided in the first shaft-like member 51, and leading to the circular channel 85 formed in part by the channel provided in the rotating circular channel making member 86 mounted rigidly in respect to the first shaft-like member 51, and in part by the stationary circular channel member 87, rigid in respect to the frame 50 and interconnected with a conduit 88 and interconnected with the exit channel 88A where a control valve 89 is provided to control (in coordination with the valve 79) the quantity and speed of flowing out of the segregated lighter components of the material to be treated.

A proper adjustment of the quantities and speeds of flowing out of segregated materials through both valves 79 and 89 is a very important subject of this invention because it permits to so coordinate them by means of proper respective adjustments of respective quantities and speeds of flow of segregated materials in respect to the heavier one and the lighter one and thus a continuous process of segregation is obtained.

The valves 79 and 89 are shown on FIGURE 1 both as fully opened, but in practice only part opening of each valve may be necessary and in some cases, for instance, the valve 79 could be opened only for N% of its passing maximum capacity, while the other one 89 only for some M% of its passing capacity. One valve could be larger than the other.

If desired, the channel 84 could be interconnected with a channel 90 and lead to the outer bottom side 161 of the second shaft-like member 54 and thereafter through a circular channel 91 formed by a circular rotating member 92 rigid with the shaft top 77 and its other part being formed by a circular channel member 93 rigid with the frame 50; the channel 94 being interconnected to the exit channel 88A and through it to the valve 89. Additional valves 96A could be provided to close totally or partially the flow through the channel 90. Valve 96 could be provided for the channel 84.

The lubrication needed for the parts of this gyrofuge could be provided by a conduit 97 passing through the frame 50 and through the first and second shaft-like members 51 and 54 to any appropriate place where the lubrication during the action of the gyrofuge is required. If desired, an electric current from a supply source 125, or 127 could as well be prvoided into the container or into any of the shaft-like members, for instance through an electric conduit 99. FIGURE 1 or 125A on FIGURES 19, 20, 21, and 22 which electric current for instance could energize the member 100 in FIGURE 1 or 124 in FIGURES 19, 20, 21 and 22 which could be any desirable electrical operating means, for instance a high frequency oscillator, or a piezo electric vibrator, or a magnetic current producing device, or a device producing heat, or a magnetic deflection device. Such energizing could then be controlled outside of the gyrofuge, by suitable, controlling means provided therefor, not shown.

Preferably, but not limiting thereto, the container 56 should be a substantially hermetically sealed container while under operation. Therefore, some special sealing means such as 101 and 102, FIGURE 1 could be provided accordingly, and lubricated if needed with a special lubrication sealing medium through the channel 97.

The gyrofuge as described will segregate any desirable material to be treated into more than one component if such components are capable of being segregated; istopes or other mixtures of heavier molecules and particles with lighter molecules and particles. If desirable, more than two different segregation components could be so segregated by providing additionally other exits for such special components in areas where they could be accumulated under the influence of the gyrofugation forces. This is not shown on the drawings.

In FIGURE 5 is shown the exit 64 for the material to be treated and the lubrication channel 97. If desired, special means shown diagrammatically as 103, 104, 105, 106, 107, 108, 109 in FIGURES 1 and 8 could be provided, for instance on a support 110 rigid to the frame 50 of FIGURE 1. Such means could be, for instance, as follows: 103 a magnetic waves producing device, 104 a temperature changing device (either cooling or heating), 105 an X-ray or alpha or beta rays emitting device, 106 an r.p.m. controlling device for the rotation of the first shaft-like member 51, 107, 108 and 109 exact control devices for the valves 155, 79 and 89 respectively. Some of them could be mounted as shown in FIGURE 1 and in FIGURE 8, or be mounted inside of the container 56 as shown for the means 100—an electric high frequency vibration producing device.

In FIGURES 1 and 3 are shown the two exit channels 84 and 85, the circular groove 84A (shown mostly in dotted lines), the circular channeling means: 86-rotatable around axis XX and 87-non-rotatable, and the exit channels 88.

Figure 7:
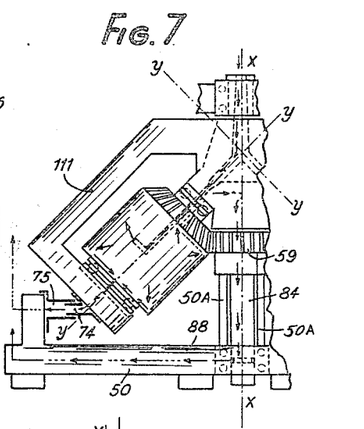
FIGURES 7, 8, 9, 10, 11 and 12 are cross-sectional side views with parts broken out of other aspects according to this invention.

In FIGURE 7 is shown another type of frame 111, and the exit channels 74 and 75 indicated schematically.

Figure 8:
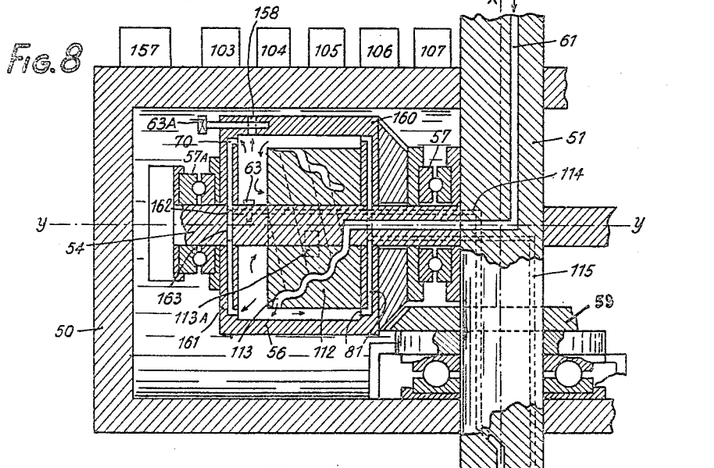

In FIGURE 8 the container 56 is provided with a central solid part 112 rigidly mounted through a locking means 113A upon the second shaft-like member 54 and thus rotating with it, and provided with a spiral funnel 113 of a flaring (or tapering) cross-section. The exit for the heavier components is provided through the exit orifices 70 and through a circular collar groove 162 mounted on the shaft 54 and interconnected through the channel 163 to the channel 114. The exit openings 81 for the lighter components could be interconnected with the channel 115 and as well lead out through the first shaft 51.

Figure 9:
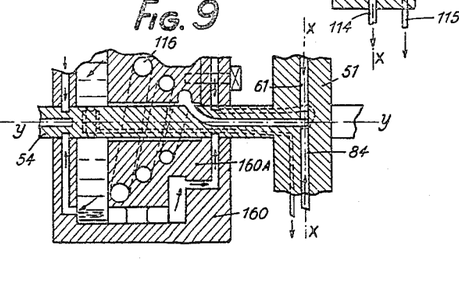

In FIGURE 9 is shown the feeding channel in the form of a spiral 116 the circular cross-section of which is conically progressively enlarged. This spiral is provided in a body 160A rigid with the top 160 of the container.

Figures 10, 11, 12, 13, 14:
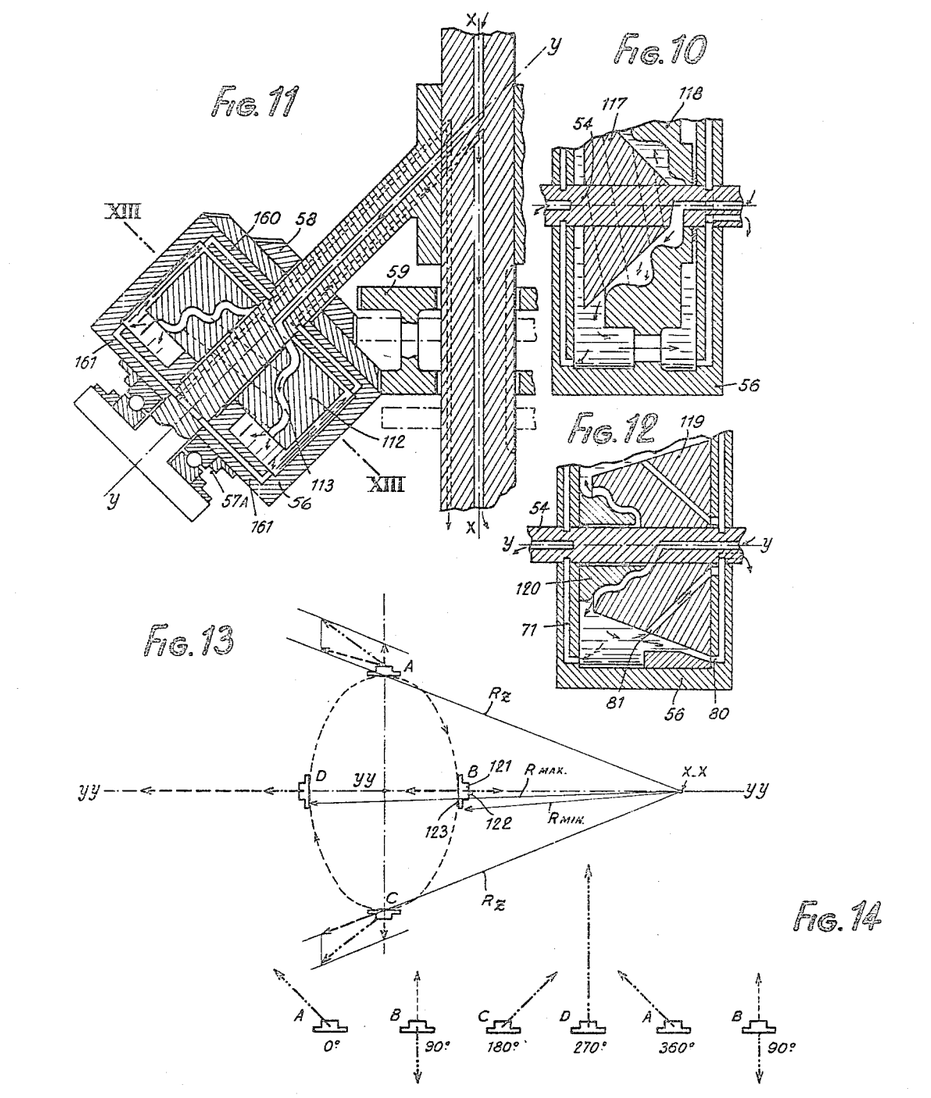
FIGURES 13 and 14 are diagrammatical schemes of force acting during one of the possible embodiments of this gyrofuge.

In FIGURE 11 is shown a spiral-like funnel 113 provided in a body 112 rigid with the bottom 161 of the container. The angle between the axes XX and XY is 45°.

In FIGURE 10 are shown a cone 117 mounted rigidly upon the second shaft-like member 54 and another spiral-like funnel body 118 mounted rigidly upon the container 56.

In FIGURE 12 is shown the upper part of a cone-formed funnel 119 mounted rigidly in respect to the second shaft 54 and another spiral funnel 120 rigid in respect to the container 56.

In FIGURES 13 and 14 are shown schematically relative dimensions of gyrofugation forces for an element or a particle 121 which is shown in its relative different positions A, B, C, and D corresponding to the gyrofuge of the type as shown in FIGURE 11, where the axes are intersecting one other at an angle of 45°. The points B and D in FIGURE 13 passing through the plane XIII—XIII in FIGURE 11 are each at different radii distances $R_{max}$ and $R_{min}$ from the axis XX; the point at A and C are at the same distance of $R_z$ from axis XX. Thus, the gyrofugation forces at each of such points will be acting in a direction of the arrows representing the component vectors of such gyrofugation forces and the resultant vectors for them. During one single rotation of the particle 121, having a top part 122 and a bottom part 123 around the axis XX, this particle is undergoing intermittently and continually the influence of different gyrofugation forces and is pulled in different directions with different efforts. Assuming that the single centrifugal force at the point B produced the particle 121 by the rotation of it around axis XX is greater (in the direction of the top part 122 of the partcle 121) than the single centrifugal force produced by the rotation of it around the axis YY, then the resulting vector may be directed even against the top, i.e. in the direction of the botton 123 of the particle 121. This is shown by way of example. Any desired combination of such values and directions of such vectors during one single rotation at given r.p.m. around the axes XX and YY could be achieved by proper choice of such r.p.m., of the angle between XX and YY and of the gear ratio between the gears 58 and 59. These so controlled magnitudes of direction and of respective values and frequencies of the component vectors and of the resulting vectors occurring during each rotation cycle around YY during gyrofugation according to this invention is the most powerful means to disintegrate or segregate the heavier components from the lighter ones with any desired purity of segregation, and with a great efficiency. Using this invention even ordinary air could be segregated into its main components.

This method and means could be also used in series, i.e. for instance a first segregation of a given material to be treated is made with one gyrofuge apparatus and thereafter, one of the so obtained (heavier or lighter) components is again subjected to a second segregation made with the same or with another type of gyrofuge, and so on until a desirable degree of segregation purity of the component is obtained.

Figures 17, 19:
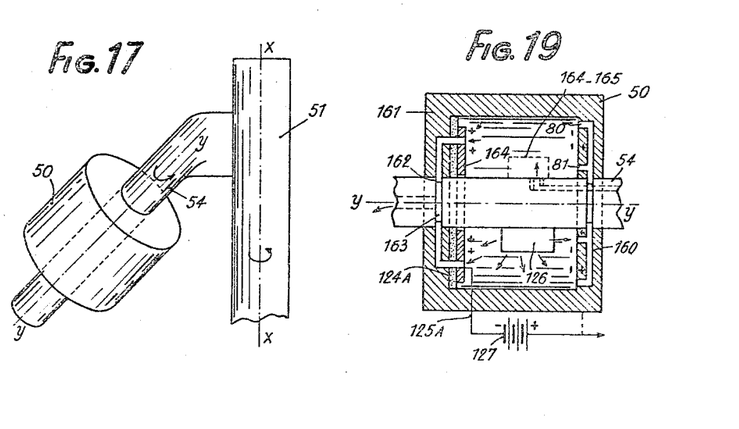
Figure 20:
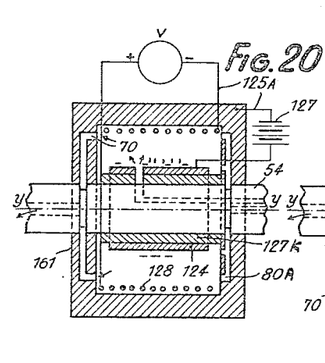

In FIGURES 19, 20, 21 and 22 are shown other embodiments of this invention. In FIGURE 19 a metal plate 124 is placed on an appropriate place of the container 56, for instance at its bottom 161, and is charged electrically with a positive or negative electric charge from a supply source 127 fed through a wire 125A, which could also be placed inside of any other channel for instance in a lubricating channel 99, or conduits 62, 84, etc. This plate 124 could be mounted through an isolation plate 124A. If the plate 124 will for instance be negatively charged, then the positively charged particles of the material to be treated wil be attracted by it during the gyrofugation or if desired, after or before it, thus the electric attraction action could contribute to the efficiency of gyrofugation. If desired, a special ionization means 126 (shown diagrammatically) such as any of the radio-active salts, or radium, or corona discharge, could be placed inside of the container 56 at any desirable part of it, for instance upon the non-rotating second shaft-like member 54. Such ionization means could act independently upon the material to be treated or in combination with the electrically charged plate 124. In FIGURE 20 is shown the plate 124 being mounted on the container 56 through a support 127B, made of a material insulating or non-insulating, rigidly attached to the container 56 and rotating with it around axis YY. The ionization means 126 could be mounted in lieu of plate 124 or jointly with it upon support 127.

Figures 15, 16, 22:
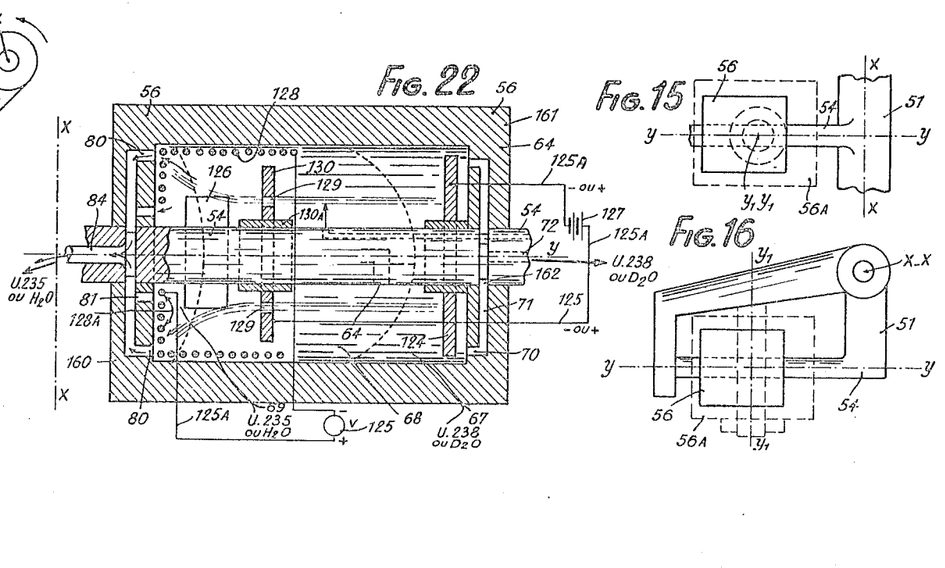
FIGURES 15, 16, 17 and 18 are schematical simplified representations of other embodiments of this gyrofuge.
FIGURES 19, 20, 21 and 22 show simplified cross-sectional side views with parts broken out of some other forms of containers used for this gyrofuge.
Figure 21:
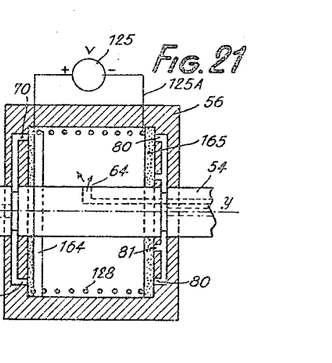

Independent of plate 124, an electric coil 128 could be provided as shown in FIGURES 20, 21 and 22 and be energized during the gyrofugation or independent of it. Such coil 128 could produce a magnetic field of any desired intensity and direction and act accordingly upon the particles, molecules or atoms of the material to be treated and in some cases this may be beneficial to the efficiency of the segregation. The use of coil 128 together with plate 124 could give a positive effect.

In FIGURE 22 is shown a container 56 rotated around the axis XX (placed on the left side of container) in combination with a well-known in the art magnetic separator having holes or slits 129 provided in a support 130 mounted either on the shaft-like member 54 (or on the container 56, not shown) through a support member 130A and having a powerful magnet (for instance a coil magnet 128) which will thus deflect the lighter substances (molecules, atoms, particles, etc.) more efficiently than the other heavier substances and will thus enable the lighter ones, for instance $U^{235}$, to be accumulated and be deposited upon a most suitable place for such a deposition, for instance in the area of orifices 80 and do so under simultaneous action of gyrofugation and of magnetic deflection, this being an important subject of this invention. The so affected lighter particles (or molecules, atoms, etc.) will then be more efficiently expelled through the openings 80 (and 81) into the channels 84 through a valve such as 89 in FIGURE 1 (not shown in FIGURE 22). The forms of coils and number of windings are optional and must be chosen to provide the desired efficiency and direction of the magnetic field and this at a desired suitable place. Such winding may be for instance as shown in FIGURE 21 or it may comprise some extra coils 128A as well on the top part 160 of the container 56 as shown in FIGURE 22, or be placed at a desirable place of the container 56. Extra coils 128A are optional. Such winding may even be provided directly around the second shaft-like member 54 (not shown) instead of being provided upon the walls of the inner sides of the container 56.

If desired, an electrically charged plate 124 may be additionally but optionally provided to work in combination with gyrofugation and magnetic deflection means 129–128 (FIG. 22).

If desired, an ionization means 126 could be used jointly with 129 and 128 and/or 124 and for this introduced into the gyrofuge of the type as shown on FIGURE 22, for instance mounted concentrically around the second shaft-like member 54.

FIGURES 15 and 16 show a gyrofuge where the container is mounted rotatably upon a second shaft-like member 54, the second axis YY of which is not intersecting the first axis XX but is parallel to it and in a different plane to it. The shaft-like member 54 could also be placed as shown in dotted lines by 54A then such container will be rotated around the axis $Y_1Y_1$ which is also perpendicular to an imaginary plane passing through the axis XX but does not intersect it.

Figure 18:
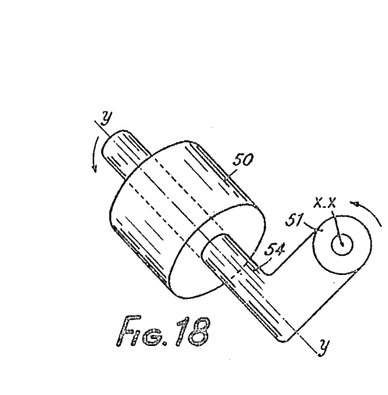

In FIGURES 17 and 18 the second axis YY is at an angle of about 45° to the projection of an imaginary plane passing through the axis XX.

If desired, the container, before being filled with the material to be treated, could be emptied of all air and a vacuum provided therein by suitable pumping means (not shown) interconnected with conduit 65, FIGURE 1. In such a case, the valve 155 should be first closed. When needed, the pump 154 will feed the material to be treated through the valve 155 under any desirable pressure into the container 56.

If desired, a vacuum or a partial vacuum could also be provided in the space between the container 56 and the frame 50, which frame, in this case should be a completely hermetically sealed housing. Such vacuum could be achieved by a vacuum pump 157 shown diagrammatically in FIGURES 1 and 8.

This invention also permits one of the components, for instance the heavier one, to be expelled directly from the container 56 into the empty space 156 for which purpose an orifice 158, shown in FIGURE 8 and in dotted lines in FIGURE 1, will be provided and, if desired, interconnected with the orifice 70. A valve means 63A could be provided to control the outlets 158 as shown in FIGURES 1 and 8. The dimensions of the orifice 158 should be properly gauged to replace the work of the valve 79. The lighter components could be expelled through an orifice 159 (shown in dotted lines in FIGURE 1) on the top part 160 of the container 56. Only one of the components could be expelled in this way, the other will still have to be expelled through the systems as described previously.

It is obvious that all the channels which are shown inside of the shaft-like members 51 and 54 could also be placed and rigidly mounted on the surfaces of these shafts and substituted, if desired, by suitable tubular elements.

Figure 23:
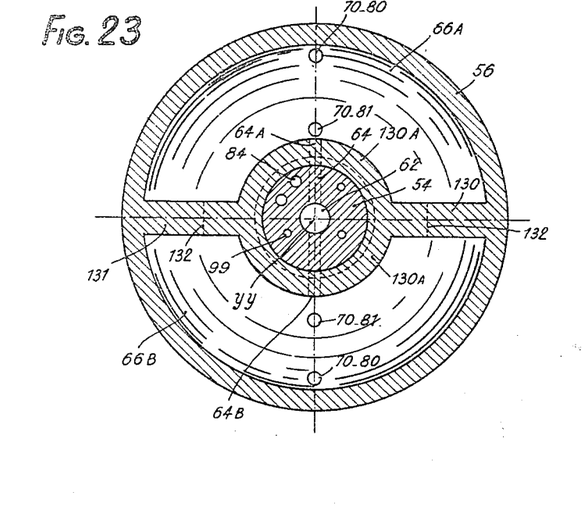
FIGURE 23 is a cross-sectional side view along V—V of FIGURE 1 of another form of a container for this gyrofuge.

In FIGURE 23 is shown another most important embodiment of this invention wherein the container 56 has its inner free closed space sub-divided into at least two different closed compartments 66A and 66B separated one from another by separation walls 130 and 131. Such separation walls may extend from the walls of the container 56 up to the surface of the second shaft-like member 54, as shown for the compartment 66A, or the separation walls could be interconnected between them by a collar-wall 130A. A similar collar-wall 130A is also shown in dotted lines in FIGURES 24 and 25. Any of these structures could be used.

Instead of having at least two compartments 66A and 66B provided by the separation walls 130 and 131 as shown in FIGURE 23, the whole free space of the container 56 could be obstacled by means of providing therein only one single wall such as the wall 130C as shown in FIGURE 5.

For an arrangement shown in FIGURE 23 the channel 62 has to be provided with two respective outlets 64A and 64B to feed respectively each of said closed compartments. If desired, however, one or all of the separating walls 130 and 131 could have a limited wall height which for instance stops at the dotted line 132 FIGURE 4 and 132C FIGURE 6 and thus an unseparated communicating space between the edge of the wall 132 and the shaft-like member 54 is provided in which case the intermediary wall 130A is eliminated. Such an arrangement will permit the material to be treated not to slide inside of the container in respect to the walls of the container during the gyrofugation. Any of the gyrofuge's herein described and illustrated in all figures could use such a type of container 56, FIGS. 6, 23 instead of a container without any separation walls. For the same purpose only one single wall could be used as shown in FIGURE 5 by 130C and in FIGURE 6 by 132C. In FIGURE 4 is shown in dotted lines 130, 131 and 132 the respective positions of the separation walls between the compartment 66A and 66B if such walls are used with the embodiments shown in FIGURE 1.

Another embodiment of this invention comprises the use of filtering elements of any nature, in particular those known in the diffusion processes, in combination with gyrofugation. This can be achieved by inserting such filter elements 164 and 165 FIGURES 21 and 19 between the exit orifices 70, 80, 81 and the material to be treated. Different filtering elements may be used for light and heavy components.

Figure 24:
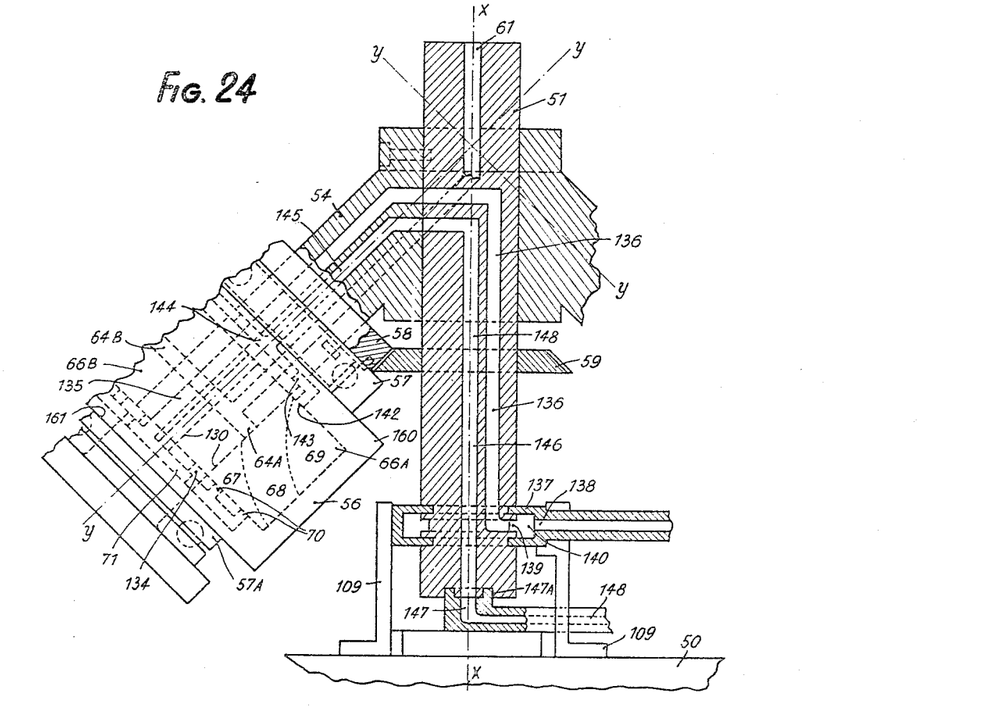
FIGURES 24, 25 and 26 are other schematical cross-sectional side views with parts broken out of other embodiments of this invention.

In FIGURES 23 and 24 is shown another embodiment of a gyrofuge wherein the axis XX and YY could be at any angle one to another, either intersecting or not intersecting one another. A 45° intersecting arrangement is shown as example. The first shaft-like member 51 is rigid with the second shaft-like member 54. The inlet conduit 61 in a tubular form feeds the material to be treated into each of the compartments 66A, 66B, etc.; if more than two are provided, through the respective orifices 64A, 64B, etc. It is supposed that the heavier components will occupy the space of the container marked in dotted lines in the area 67 while the components still mixed together will occupy the space marked as area 68, and the lighter components as area 69.

For the evacuation of the heavier components one or more exit orifices 70 could be provided accordingly in the body of the container and operatively interconnected through a circular groove 134 provided in the shaft-like member 54 and from it through an appropriate conduit to the conduit 135 provided in the shaft-like member 54 and from it through the conduit 136 provided in the shaft-like member 51 and thereafter through the opening exit 137 into the channeling means 138 which are composed of a circular groove 139 provided on the shaft 51 and thus rotated about the axis XX together with the shaft 51 and another circular groove 140 provided in the channeling means rigidly affixed in respect to the frame 50 through supporting means 109. From hereon, the heavier components are thus evacuated through a valve into their recipient.

The lighter components will be evacuated through the opening 142 provided in the body of the container 56 and conducted through the circular groove 143 provided in the shaft-like member 54 and through the channel 144 and through the conduit 145 provided in the shaft 54 and thereafter through the conduit 146 provided in the shaft 51 and emerging on the bottom of it, in this example concentrically with axis XX thereafter the lighter components are expelled through the channels 147 and 148 and thereafter through a valve to the respective receiver. The interconnecting means to interconnect channel 147 with the channel 146 could be realized as shown by the circular groove 147A mounted on the shaft 51 in which the member carrying the channel 147 is provided as shown in FIGURE 24.

These present arrangements permit to have much smaller surfaces of friction between the non-rotating and rotating parts of the respective channeling circular members than the arrangement described in reference to FIGURES 1 and 2.

Figure 25:
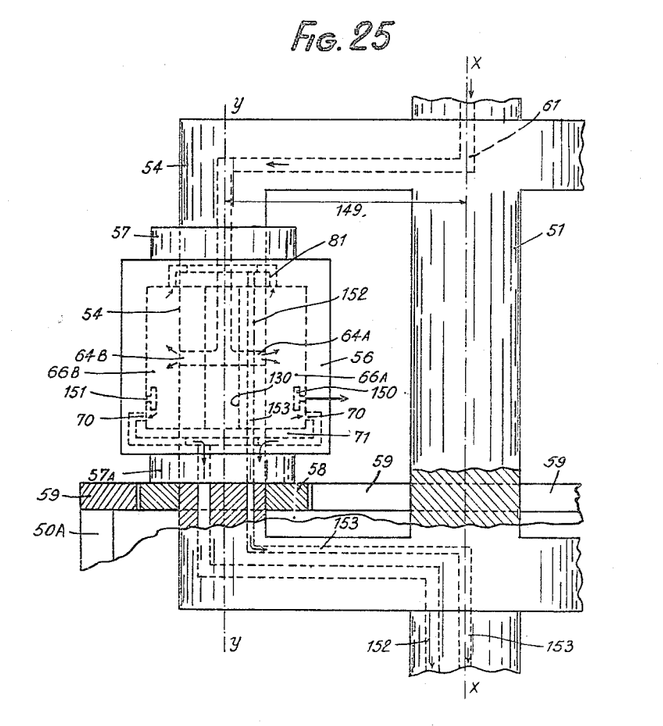

FIGURE 25 shows a first shaft 51 and a second shaft 54 which is parallel to the first shaft but at a distance 149 from it which is the radius of rotation of the axis YY around the axis XX. A container 56 for example could have two separate compartments 66A and 66B of the same type as shown in FIGURE 23. In this arrangement the container 56 is rotated by the respective gears 58 and 59 previously described, thus a minimum centrifugal force will be produced upon a particle of material to be treated shown diagrammatically by 150 when it will be in the position as shown in FIGURE 25 because then it will be the closest distance to the first axis XX and because the force caused by rotating 150 around axis YY, shown by an arrow at 150, will work against the centrifugal force produced by rotating this same particle simultaneously around the axis XX. Thus, the resultant force at 150 will be much smaller than that at 151 where both centrifugal forces are added one to another instead of being subtracted. Thus is created a pulsating force. If axis YY is at an angle, for instance of 45° to axis XX, then other differentiations in the forces will be produced as this was described for FIGURES 13 and 14. The exit orifices 70 will permit the heavier components to be evacuated from the container in the previously described manner through the conduit 152 while the lighter weight components could be evacuated through the orifice 81 and conduit 153 mounted eccentrically in the shaft 54 but concentrically in the shaft 51, this by way of example. Such an arrangement could be useful for several applications. The magnitude and direction of the resulting vectors depend upon the respective radii of rotation and angular velocity and (r.p.m.) or rotation around both axes XX and YY.

Figure 26:
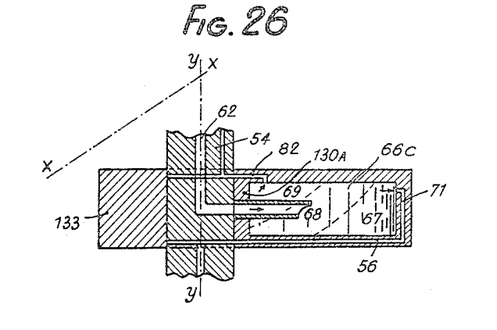

On FIGURE 26 is shown only one closed container 56 having a wall 130A separating its free space 66C from the shaft-like member 54. This space 66C could be in the form similar to the space 66A, FIGURE 23, or have a rectangular or cubic form. In such an embodiment, it is necessary to counterbalance the exact weight of the container 56 filled with MT[1] by providing a counterweight 133 mounted just opposite of the container 56 and rigidly interconnected with it. The inlet and outlet channels, etc. are shown in FIGURES 25 and 26 schematically.

In all the drawings the containers and other parts are mostly shown as made out of one piece, but this was done only for simplification. In practice, the containers have to be made so that they could be easily dismantled. Also, nearly all the structures are shown as having two bearings 57 and 57A mounted rotatably in respect to the second shaft-like member 54. Instead of two such bearings, only one of them could be used and then the structure of the gyrofuge changed accordingly as shown by example on FIGURE 11 where only the bearing 57A is used. In such a structure the load should be carried only by the bearing 57 and it should be made sufficiently strong. Such an apparatus using only one bearing 57 could have that part of the shaft-like member 54 which traverses the container 56 and emerges through it shortened. Bearings for the first shaft-like member 51, frame, etc., are not shown in FIGURES 24, 25 and 26.

This invention is also applicable for gyrofugation of various chemical substances, organic or non-organic; in particular blood, urine, plasmas, various biological liquids, oil; petroleum and natural gases, could be thus treated and separated.

Although this invention is described as providing a continuous gyrofugation and a continuous segregation of material to be treated into its components, it could however also be used like a non-continuous gyrofugation or segregation. For instance, the valves 79, 89 and 155 could be closed and then the material to be treated could be first gyrofuged during a given time and only thereafter could the segregated components be expelled from the container by continuing the action of gyrofugation and by opening the respective valves 79 and 89.

In many instances, the evacuation of the segregated components by the gyrofugation action could be used in combination with a substantial pressure provided inside of the container. This can be done by introducing the material to be treated under any desirable pressure. Such pressure could provide, if desired, sufficient energy to evacuate the segregated components through their respective channels overcoming the respective contrifugal and gyrofugation forces to which such components are submitted, while moving through various channèls and orifices to their respective receivers. Such pressure in the container could also be produced by introducing into the container air or any desirable gas, which will not interfere with the segregation or may assist it in one or other way. For instance, nitrogen or hydrogen or superheated steam or mixtures thereof could be introduced into the container under any desirable pressure for this purpose.

The respective valves: —79 for the heavier component and —89 for the lighter component and the respective conduits should be so constructed and so gauged that they will be in position to handle accordingly the respective quantities of the respective components flowing through them. In the case of $U^{235}$ and $U^{238}$, the valve 79 expelling the $U^{238}$ should be so made that it could pass about 120 to 150 times more quantity of the $U^{238}$ (the heavier component) than the valve 89 which will evacuate the lighter component $U^{235}$. The exact coordination of these valves is one of the main subjects of this invention particularly for a continuous segregation.

I claim:

1. A gyrofuge for segregation of a material to be treated by subjecting it to gyrofugation, said material being composed of at least two different specific weight components, a heavier specific weight component and a lighter specific weight component, said gyrofuge comprising a frame, a first shaft-like member which is rotated around a first axis of rotation XX being rotatably mounted on said frame, a second shaft-like member being rigidly mounted in respect to said first shaft-like member, means to rotate said first shaft-like member in respect to said frame, a hermetically sealed from the atmosphere closed container for said material being rotatably mounted on said second shaft-like member and rotating around a second axis YY of rotation, means to rotate said container in respect to said second axis YY of rotation, said container thus being simultaneously rotated around said second axis YY and around said first axis XX, thus exercising gyrofugation forces upon said material, an inlet valve means, conduits means provided in said first shaft-like member and communicating with a first channeling means provided in said second shaft-like member to channel said material into the inner closed space of said container where it is subjected to the action of said said gyrofugation forces, at least one first channeling discharge means for said heavier component being provided in the area of maximum values of said gyrofugation forces, to conduct it through a first conduit and a first valve means to a recipient of said heavier component and at least one second channeling discharge means for said lighter component being provided in the area of minimum values of said gyrofugation forces to conduct it through a second conduit means and a second valve means to a recipient of said lighter component, said container, said inlet valve means, said conduit means, said first channeling means, said first channeling discharge means, said first valve means, said second channeling discharge means, said second conduit means, and said second valve means of said second channeling discharge means all forming a hermetically sealed system controlled by the operation of said valves.

2. A gyrofuge as set forth in claim 1 wherein said container has one radial separation wall, extending from that inner surface of said container which is furtherest away from the axis of rotation of said first shaft-like member to the outer surface of said second shaft-like member, the plane of said wall being parallel to the axis of said second shaft-like member, thus providing in said container at least one container part, whereby said separation wall prevents said material to be treated from spinning inside of the said container upon the inner surface of it and this independent from its rotation around said axes XX and YY.

3. A gyrofuge as set forth in claim 1 wherein said container has at least two radial separation walls, each said walls extending from that inner surface of said container which is furtherest away from the axis of rotation of said first shaft-like member to the outer surface of said second shaft-like member, the plane of said walls being parallel to the axis of said second shaft-like member, thus providing in said container at least two container parts, whereby said separation wall prevents said material to be treated from spinning inside of the said container upon the inner surface of it and this independent from its rotation around said axes XX and YY.

4. A gyrofuge as set forth in claim 1, wherein said container has at least one radial separation wall, extend- ---
[1] MT=material to be treated.

ing at least partially from that inner surface of said container which is furtherest away from the axis of rotation of said first shaft-like member to the outer surface of said second shaft-like member, the plane of said wall being parallel to the axis of said second shaft-like member, thus providing in said container at least one container part, whereby said separation wall prevents said material to be treated from spinning inside of the said container upon the inner surface of it and this independent from its rotation around said axes XX and YY.

5. A gyrofuge as set forth in claim 1, wherein each of said channeling means comprises also one rotatable channeling circular member rotated together with said second shaft-like member around said first axis XX and one non-rotatable channeling circular member rigid in respect to said frame, both said circular members operatively and matingly engaging one another and forming between them respectively a part of each of said channeling means, said valve means provided in each of said channeling means having control means to control one in respect to another the quantities and the speeds of flow of the segregated components passing through each of said channeling means.

6. A gyrofuge as set forth in claim 1, wherein at least one ioniaztion means is provided in said gyrofuge enabling the ionization in said container of at least part of said material and at least one of its components during its gyrofugation.

7. A gyrofuge as set forth in claim 1, wherein at least one ionization means is provided in said gyrofuge enabling to ionize at least one part of said material and at least one of its components during is gyrofugation, and additionally a magnetic deflection means is provided in said container to affect behaviour of the so-ionized material and its components.

8. A gyrofuge as set forth in claim 1, wherein at least one ionization means is provided in said gyrofuge enabling the ionization of at least one part of said material and at least one of its components during its gyrofugation, an electrical, magnetic coil being provided in said container, and means to energize it during gyrofugation, whereby said so-ionized material and its components are accordingly deflected and guided by magnetic field created by said coil.

9. A gyrofuge as set forth in claim 1, wherein said valve means have control means to control one in respect to another the quantities and the speeds of flow of said components passing through each of said channeling means.

10. A gyrofuge as set forth in claim 1, wherein said axis XX is at an angle of 45° to the axis YY and intersects it at an angle of 45°.

11. A gyrofuge as set forth in claim 1, wherein said axis XX is perpendicular to said axis YY but does not intersect it.

12. A gyrofuge as set forth in claim 1, wherein said first axis of rotation XX is parallel to said second axis of rotation YY and at a distance from it, whereby the said two rotations are parallel to each other, but not concentric one to another.

13. A gyrofuge for segregating a material composed of at least two different specific weight components, a heavier specific weight component and a lighter specific weight component, said gyrofuge comprising a frame, a closed container for said material, means for rotating the container simultaneously around two different axes of rotation, a first axis XX and a second axis YY, a first shaft-like member mounted rotatably on said frame being provided concentrically to the first axis of rotation XX and a second shaft-like member being provided rigidly with respect to said first shaft-like member and mounted concentrically to the second axis of rotation YY, an inlet valve means being provided to control the inlet flow of said material to be treated into said container, said inlet valve means being interconnected with a first conduit provided in said first shaft-like member through which said material to be treated is introduced into said container, at least one first exit channeling means being provided for said heavier weight component substantially in an area of that part of the container where the greatest gyrofugation forces are realized during gyrofugation, thus accumulating thereabout mostly said heavier component, said first exit channeling means emerging into a first collecting rotatable circular channel member provided rigidly in respect to said second shaft-like member and rotatable therewith around the first axis XX and being operatively interconnected with a second collecting non-rotatable circular channel member mounted upon the frame, at least one outlet orifice discharging said heavier component from said second non-rotatable collecting circular channel member through an exit conduit and through a first tubular member provided therefor into a receiver for said heavier components, at least one second outlet orifice for discharging said lighter component being provided in an area of that part of said container where there is substantially the smallest gyrofugation forces, thus accumulating thereabout mostly said lighter component, a second exit channel being interconnected with a third outlet orifice emerging into a second rotatable collect-circular channel member rotated around said first axis XX and mounted rigidly in respect to said first shaft-like member being operatively interconnected with a second collecting non-rotatable circular channel members mounted rigidly in respect to said frame, a fourth exit orifice being provided in said latter member, a second tubular member interconnected therewith to discharge said lighter component to a receiver for said lighter component, having additionally a valve means provided in said first tubular member for the heavier component and another valve means being provided in second tubular member for the lighter component, said valve means having control means to control one in respect to another the quantities and the speeds of flow of the segregated component passing through each of said channeling means.

14. A method of segregation of a fluid material having at least two components, one heavier and one lighter specific weight component, comprising the steps of subjecting said material to a continuous gyrofugation action composed of a simultaneous action of two differently directed centrifugal forces, which due to the changing in their respective values and directions produce thereafter a continuous segregating of said material into at least two of its said components and thereafter continually place said components in at least two different areas of segregation each area corresponding to one of said components and thereafter expel continually each of said so segregated components from said areas while controlling and balancing during such evacuation of them the exact desirable quantum and speed of respective outputs of each so dischargeable segregated components into storage recipients.

15. A method, as set forth in claim 14, wherein during at least a part of said gyrofugation said material is subjected to an action of ionization and at the same time to an action of magnetic deflection.

16. A method as set forth in claim 14, wherein during at least a part of said gyrofugation said material is subjected to an action of ionization and to an action of magnetic attraction and to an action of magnetic deflection.

17. A method as set forth in claim 14, wherein during at least a part of said gyrofugation said material is subjected to an action of compression.

18. A method as set forth in claim 14, wherein the said material is water and the components to be segregated are heavy water $D_2O$ and ordinary water $H_2O$.

19. A method as set forth in claim 14, wherein the said material is a natural uranium-containing fluid and the main components of it to be segregated are $U^{235}$ (the light weight component) and $U^{238}$ (the heavy weight component).

20. A method as set forth in claim 14, wherein said material is air.

References Cited by the Examiner
UNITED STATES PATENTS

| | | | |
|---|---|---|---|
| 473,005 | 4/1892 | Hult | 233—17 |
| 689,561 | 12/1901 | McKenna | 233—27 X |
| 949,226 | 2/1910 | Goodman | 223—17 |
| 1,861,878 | 6/1932 | Quiroz | 223—25 |
| 2,135,839 | 11/1938 | Persons | 233—25 X |
| 2,208,230 | 7/1940 | Rubissow | 22—65 |
| 2,292,483 | 8/1942 | Rowell | 233—1 X |
| 2,428,434 | 10/1947 | Rubissow. | |
| 2,433,065 | 12/1947 | Rubissow. | |
| 2,495,483 | 1/1950 | Rubissow. | |
| 2,543,303 | 2/1951 | Rubissow | 18—26 |
| 2,822,127 | 2/1958 | Sinn | 233—25 X |
| 2,876,949 | 3/1959 | Skarstrom | 233—11 |
| 2,906,449 | 9/1959 | Sullivan. | |
| 3,129,174 | 4/1964 | Pickels et al. | 223—11 |

FOREIGN PATENTS 70,775    9/1952    Netherlands.

M. CARY NELSON, *Primary Examiner.*

HARRY B. THORNTON, E. PAUL, R. F. BURNETT, H. L. MARTIN, *Assistant Examiners.*